United States Patent
Habermehl et al.

[11] Patent Number: 5,870,933
[45] Date of Patent: Feb. 16, 1999

[54] ADVANCE MECHANISM FOR COLLATED SCREWDRIVER

[76] Inventors: G. Lyle Habermehl, 436 Calvert Dr., Gallatin, Tenn. 37066; Paul Townsend Scherer, 4145 Bridgemont La., Lexington, Ky. 40514

[21] Appl. No.: 771,962

[22] Filed: Jan. 1, 1997

Related U.S. Application Data

[63] Continuation-in-part of Ser. No. 673,398, Jun. 28, 1996, Pat. No. 5,775,185, and a continuation-in-part of Ser. No. 511,945, Aug. 7, 1995, Pat. No. 5,568,753.

[51] Int. Cl.⁶ .................................................. B25B 23/06
[52] U.S. Cl. ............................ 81/434; 81/57.37; 227/136
[58] Field of Search ................................. 81/57.37, 434; 227/136

[56] References Cited

U.S. PATENT DOCUMENTS

| | | | |
|---|---|---|---|
| 1,815,594 | 7/1931 | Shaw et al. . | |
| 3,550,831 | 12/1970 | Lejdegard et al. | 81/57.37 |
| 3,554,246 | 1/1971 | Halstead | 144/32 |
| 3,601,168 | 8/1971 | Farnstrom | 144/32 |
| 3,623,646 | 11/1971 | Cast | 227/136 |
| 3,826,419 | 7/1974 | Maestri | 227/136 |
| 3,910,324 | 10/1975 | Nasiaka | 144/32 |
| 3,930,297 | 1/1976 | Potucek et al. | 29/431 |
| 4,014,225 | 3/1977 | Lejdegard et al. | 81/57.37 |
| 4,018,254 | 4/1977 | DeCaro | 91/57.37 |
| 4,019,631 | 4/1977 | Lejdegard et al. | 206/347 |
| 4,146,071 | 3/1979 | Mueller et al. | 144/32 |
| 4,167,229 | 9/1979 | Keusch et al. | 206/343 |
| 4,367,837 | 1/1983 | Manino | 227/136 |
| 4,404,877 | 9/1983 | Mizuno et al. | 81/57.37 |
| 4,428,261 | 1/1984 | Takatsu et al. | 81/434 |
| 4,581,964 | 4/1986 | Takatsuru | 81/434 |
| 4,625,597 | 12/1986 | Cast | 81/57.37 |
| 4,930,630 | 6/1990 | Habermehl | 206/347 |
| 4,998,452 | 3/1991 | Blum | 81/57.37 |
| 5,027,679 | 7/1991 | Kawashima | 81/434 |
| 5,031,489 | 7/1991 | Young et al. | 81/430 |
| 5,083,483 | 1/1992 | Takagi | 81/434 |
| 5,186,085 | 2/1993 | Monacelli | 81/434 |
| 5,231,900 | 8/1993 | Deri | 81/57.37 |
| 5,284,074 | 2/1994 | Chen | 81/434 |
| 5,303,620 | 4/1994 | Payne et al. | 81/434 |
| 5,337,635 | 8/1994 | Habermehl | 81/434 |
| 5,341,706 | 8/1994 | Takagi | 81/434 |
| 5,402,659 | 4/1995 | Hornung | 81/434 |
| 5,452,630 | 9/1995 | Haas et al. | 81/434 |
| 5,469,767 | 11/1995 | Habermehl | 81/434 |
| 5,473,965 | 12/1995 | Chen | 81/434 |
| 5,531,142 | 7/1996 | Adamo | 81/434 |
| 5,542,323 | 8/1996 | Habermehl | 81/434 |
| 5,568,753 | 10/1996 | Habermehl | 81/434 |
| 5,570,618 | 11/1996 | Habermehl | 81/434 |

FOREIGN PATENT DOCUMENTS

| | | | |
|---|---|---|---|
| 1040600 | 10/1978 | Canada | 219/1 |
| 1054982 | 5/1979 | Canada | 219/2 |
| 2750562 | 5/1979 | Germany . | |
| 2132531 | 7/1984 | United Kingdom . | |
| 2147873 | 5/1985 | United Kingdom . | |

*Primary Examiner*—James G. Smith

[57] ABSTRACT

A driver attachment for driving screws in a collated screwstrip. The attachment having a housing and a slide body slidable axially relative to the housing with the slide body carrying a shuttle slidable transversely relative the slide body. A lever is coupled at one end to the housing and at another end to the shuttle such that reciprocal movement of the housing and slide body axially reciprocally cycles the shuttle transversely. The slide body preferably carries a bearing member which when the slide body approaches a fully extended postion, engages the lever to assist the lever in drawing the shuttle inwardly to advance the screwstrip.

18 Claims, 7 Drawing Sheets

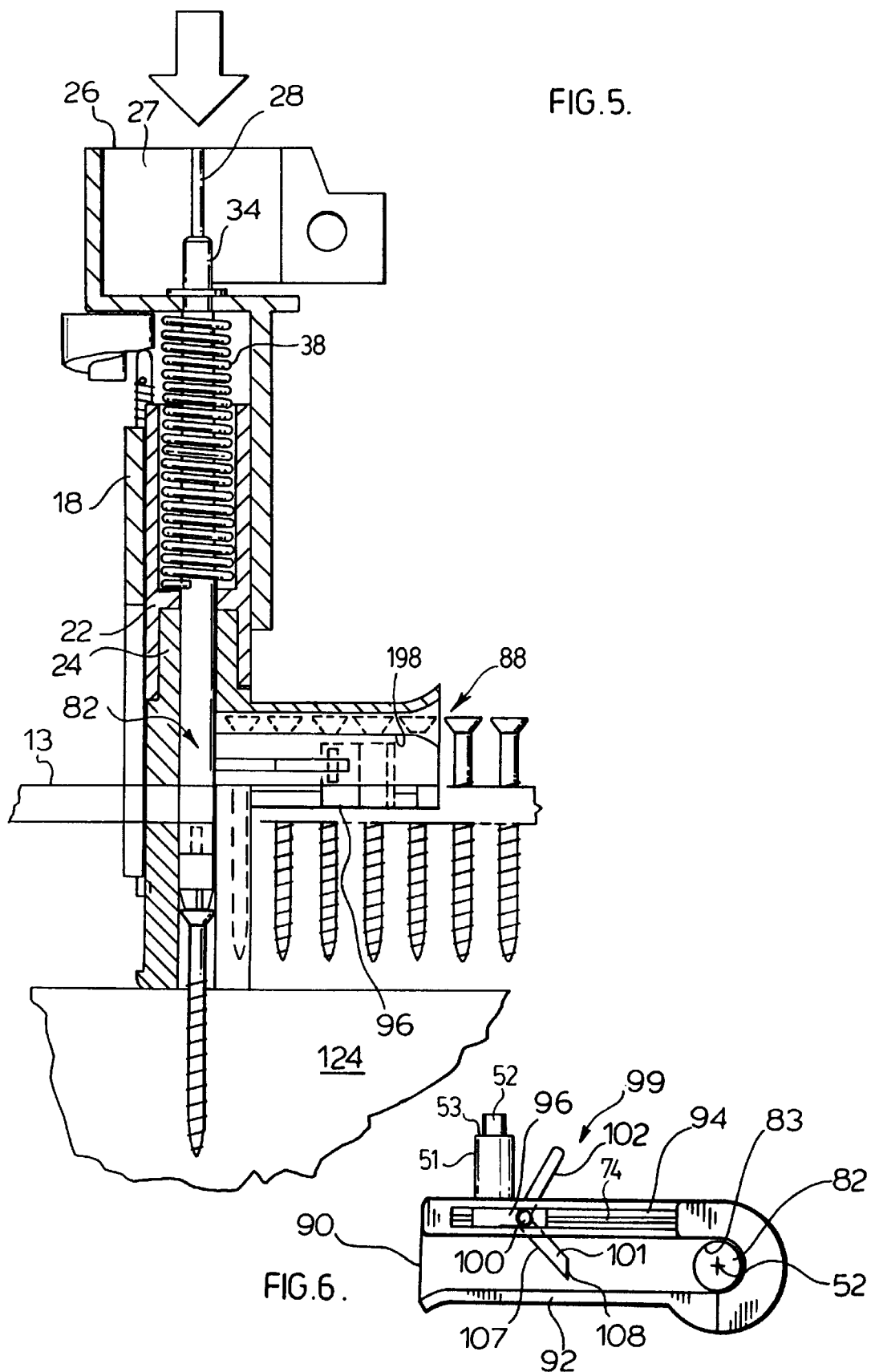

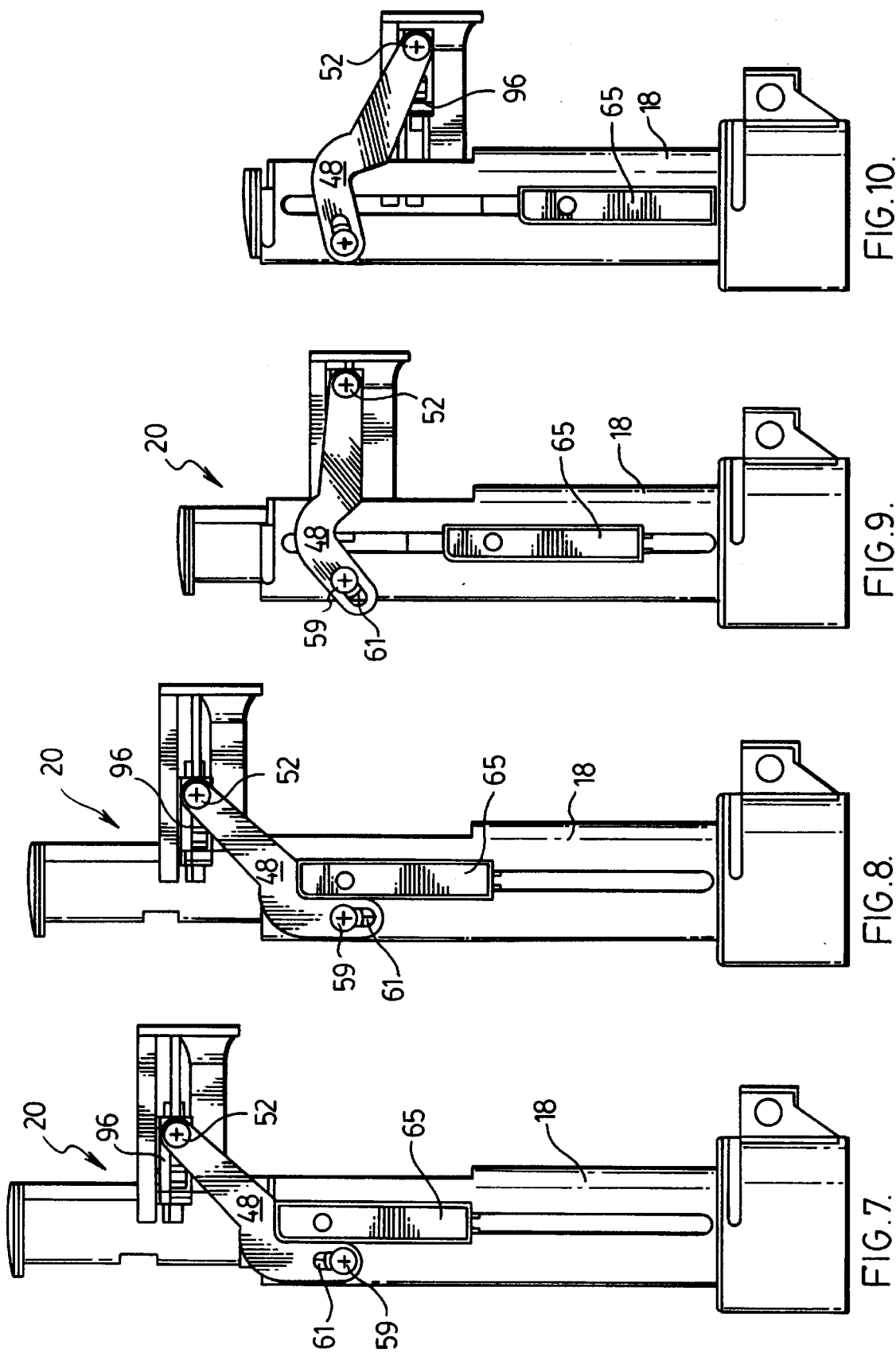

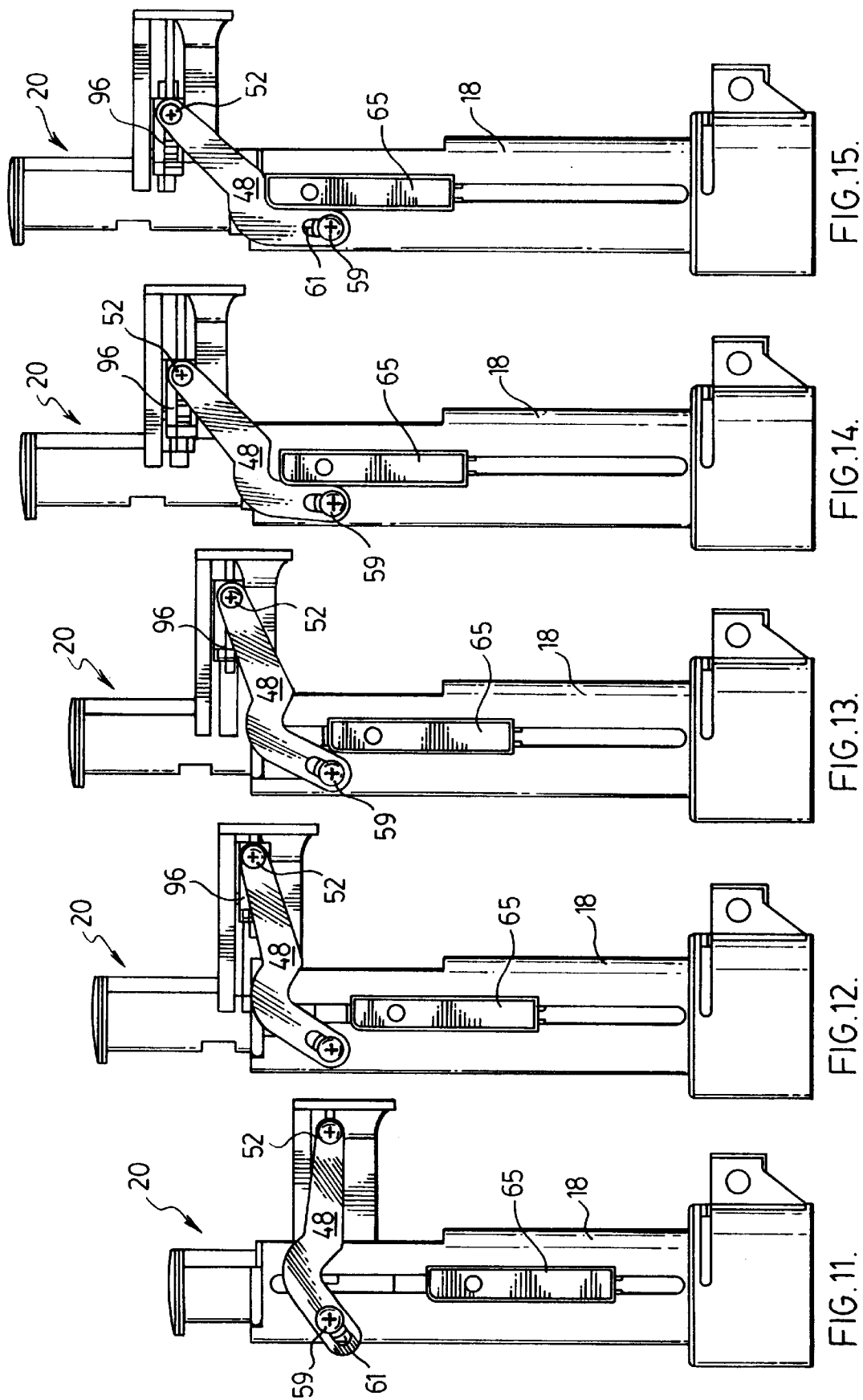

ADVANCE MECHANISM FOR COLLATED SCREWDRIVER

RELATED APPLICATIONS

This application is a continuation-in-part of U.S. patent application Ser. No. 08/673,398, filed Jun. 28, 1996, now U.S. Pat. No. 5,775,185, and a continuation-in-part of U.S. patent application Ser. No. 08/511,945, filed Aug. 7, 1995 and issued as U.S. Pat. No. 5,568,753.

SCOPE OF THE INVENTION

This invention relates generally to a screwdriver for driving collated screws which are joined together in a strip and, more particularly, to an advance mechanism to advance the screwstrip in the screwdriver.

BACKGROUND OF THE INVENTION

Collated screwstrips are known in which the screws are connected to each other by a retaining strip of plastic material. Such strips are taught, for example, by U.S. Pat. No. 4,167,229, issued Sep. 11, 1979 and its related Canadian Patents 1,040,600 and 1,054,982, as well as U.S. Pat. No. 4,930,630, the disclosures of which are incorporated herein by reference. Screws carried in such screwstrips are adapted to be successively incrementally advanced to a position in alignment with and to be engaged by a bit of a reciprocating, rotating power screwdriver and screwed into a workpiece. In the course of the bit engaging the screws and driving it into a workpiece, the screw becomes detached from the plastic strip leaving the strip as a continuous length.

In the use of such collated screwstrips in screwdrivers, the strip serves a function of assisting in guiding the screw into a workpiece and, to accomplish this, the strip is retained against movement towards the workpiece. In the screwstrip, each screw to be driven has its threaded shaft threadably engaged in a threaded sleeve of the strip such that on the screwdriver engaging and rotating each successive screw, the screw turns within the sleeve which acts to guide the screw as it moves forwardly into threaded engagement into the workpiece. Preferably, only after the tip of the screw becomes engaged in the workpiece does the head of the screw come into contact with the sleeves. Further, forward movement of the screw into the workpiece then draws the head downwardly to engage the sleeve and to rupture the sleeve by reason of the forward movement of the head with the strip retained against movement towards the workpiece. The sleeve preferably is configured to have fragile strips which break on the head passing through the sleeve such that the strip remains intact as a continuous length. Since the strip is a continuous length, on advancing the screwstrip with each successive screw to be driven, it necessarily results that portion of the strip from which each screw has been driven are also advanced to exit from the power screwdriver.

Known power screwdrivers for driving such collated screwstrips include U.S. Pat. No. 4,146,071 to Mueller et al, issued Mar. 27, 1976, and U.S. Pat. No. 5,186,085 to Monacelli, issued Feb. 16, 1993. Such known power screwdrivers include a rotatable and reciprocally moving screwdriver shaft which is turned in rotation by an electric motor. A screwdriving bit forms a forwardmost portion of the shaft for engaging the head of each successive screw as each screw is moved into a driving position, axially aligned under the screwdriver shaft.

An important aspect of such a power screwdriver is the manner and accuracy with which the screws are advanced and positioned so as to be properly aligned axially under the screwdriver shaft for successful initial and continued engagement between the bit and the screwdriver head in driving a screw fully down into a workpiece. In the device of Mueller et al, a guide channel is provided through which the screwstrip is advanced. The guide channel is sized to receive screws of specific head size and minimum length. The guide channel is formed as an integral part of a sliding body which also carries other components of a screw advance mechanism to engage the screwstrip and advance the screwstrip in the guide channel. The screws are successively advanced into position in alignment with the screwdriver shaft with the heads of the screws being urged into abutment with a stop which is to locate the screw head. The stop typically defines a radial extent of a boreway through which the shaft and screw head axially move as the screw is driven. The shaft is axially movable in the boreway in a reciprocal manner to engage the screw and drive it into a workpiece. After each screw is driven the shaft retracts and a subsequent screw carried on the screwstrip is advanced sideways into the boreway, engaging the stop so as to be aligned under the shaft.

Known power drivers for collated screws have a slide body which is reciprocally slidable relative a housing in a normal cycle of operation. Known screw advance mechanisms are coupled between the slide body and housing to translate relative movement of the slide body and housing into a cyclical cycle of advance of the screwstrips.

Known screw advance mechanisms suffer the disadvantage that they are complex and typically involve a number of components which need to be shrouded and protected. For example, in the device of Mueller et al, U.S. Pat. No. 4,146,871, the advance mechanism comprises three interrelated lever members together with a camming roller which cams on a camming surface. A primary spring biases the slide body to an extended position relative the housing. A secondary spring biases the lever members to urge the roller into the screwstrip towards the fully advanced position. The secondary spring has the disadvantage of requiring additional forces for operation so as to telescope the slide body into the housing and to overcome friction in telescoping or in extension. Known screwstrip advance mechanisms are unduly complex, expensive to manufacture, cumbersome, bulky and inconsistent in their features with providing a lightweight tool of minimum size.

SUMMARY OF THE INVENTION

To at least partially overcome these disadvantages of the prior art, the present invention provides, in one aspect, in a screwdriver for driving screws having a housing and a slide body slidable axially relative to the housing with the slide body carrying a shuttle slidable relative the slide body transversely, a lever is coupled at one end to the housing and at another end to the shuttle such that reciprocal movement of the housing and slide body axially reciprocally cycles the shuttle transversely. The slide body preferably carries a bearing member which, when the slide body approaches a fully extended position, engages the lever to assist the lever in drawing the shuttle inwardly to fully advance the screwstrip.

An object of the present invention is to provide an improved screwstrip advance mechanism for power screwdrivers for driving collated screws.

Another object is to provide a simple screwstrip advance mechanism which has a minimum of parts yet ensures proper advance of a screwstrip.

Accordingly, in one aspect, the present invention provides an apparatus for driving with a power driver a screwstrip comprising threaded fasteners, such as screws or the like, which are joined together in a strip comprising:

a housing;

an elongate drive shaft for operative connection to a power driver for rotation thereby and defining a longitudinal axis;

a slide body coupled to the housing for displacement parallel to the axis of the drive shaft between an extended position and a retracted position;

the slide body having a guide channel for said screwstrip transverse to the axis, a shuttle carried on the slide body movable relative the slide body transverse to the axis towards and away from the axis, the shuttle carrying pawl means for engagement with the screwstrip to advance the screwstrip with movement of the shuttle towards the axis to place successive of the fasteners into axial alignment with the drive shaft for driving by the drive shaft, and a lever having a first end coupled to the shuttle and a second end coupled to the housing whereby movement of the slide body axially relative the housing (a) towards the extended position moves the shuttle towards the axis and (b) away from the extended position moves the shuttle away from the axis and, preferably, with a bearing member on the slide body which engages the lever intermediate the first end and the second end of the lever when the slide body is proximate the extended postion such that when the slide body moves axially towards the extended position, the bearing member urges the lever to assist moving the shuttle towards the axis.

BRIEF DESCRIPTION OF THE DRAWINGS

Further aspects and advantages of the present invention will appear from the following description taken together with the accompanying drawings, in which:

FIG. 5 is a view identical to FIG. 4 but with the driver attachment in a partially retracted position in driving a screw into a workpiece;

FIG. 6 is an end view of the nose portion of FIG. 2;

FIGS. 7 to 15 are side views of the driver attachment of FIGS. 1 to 6 showing the attachment in successive positions in a cycle of operation, with FIGS. 7 and 15 showing the attachment in the same fully extended position and FIG. 10 showing the attachment in the fully retracted position.

DETAILED DESCRIPTION OF THE DRAWINGS

Figure 1:
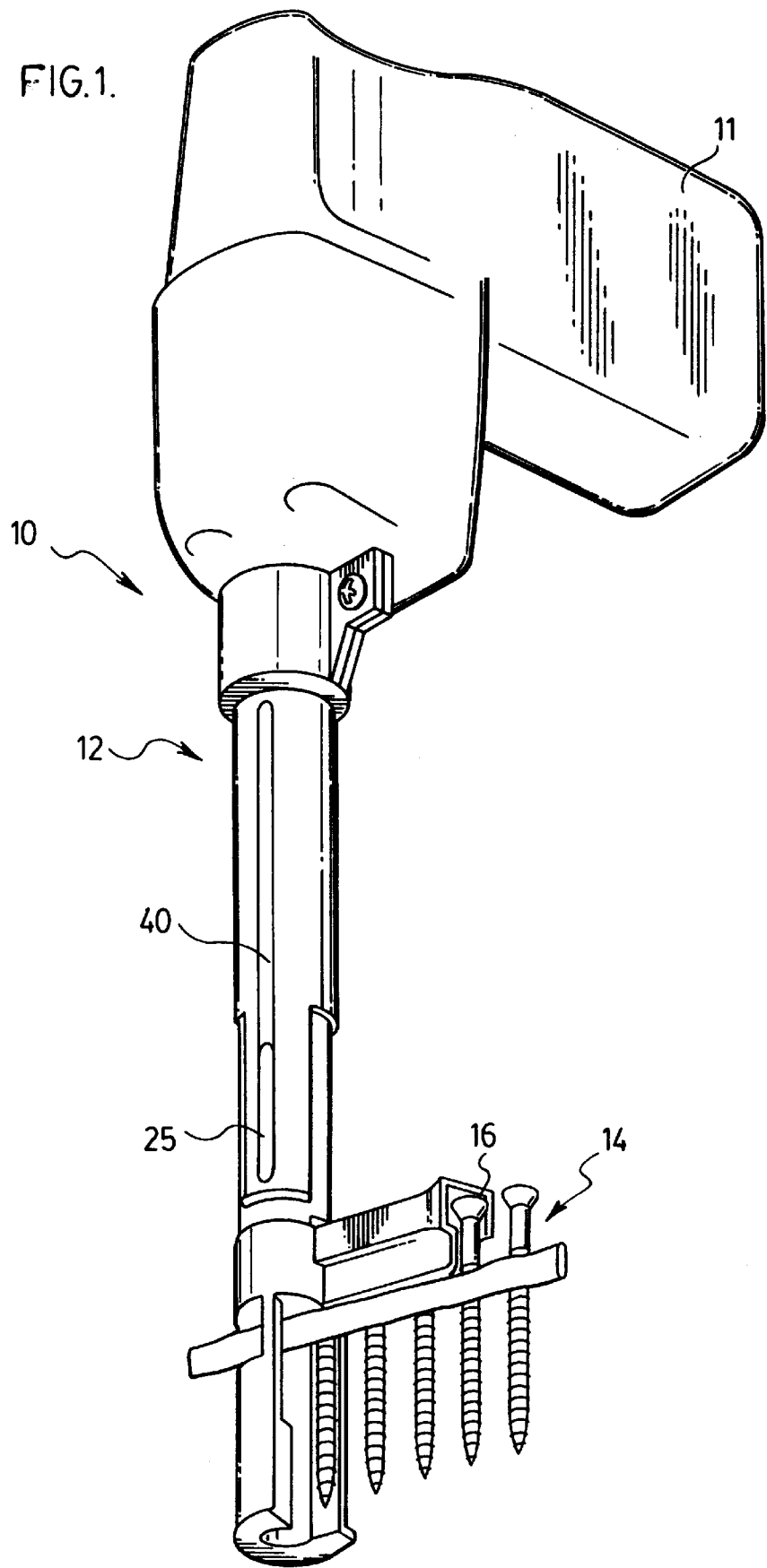
FIG. 1 is a pictorial view of a power screwdriver in accordance with a first preferred embodiment of the present invention.

Reference is made to FIG. 1 which shows a complete power screwdriver assembly 10 in accordance with the present invention. The assembly 10 comprises a power driver 11 to which a driver attachment 12 is secured. The driver attachment 12 is adapted to receive a collated screwstrip 14 carrying spaced screws 16 to be successively driven.

Figure 2:
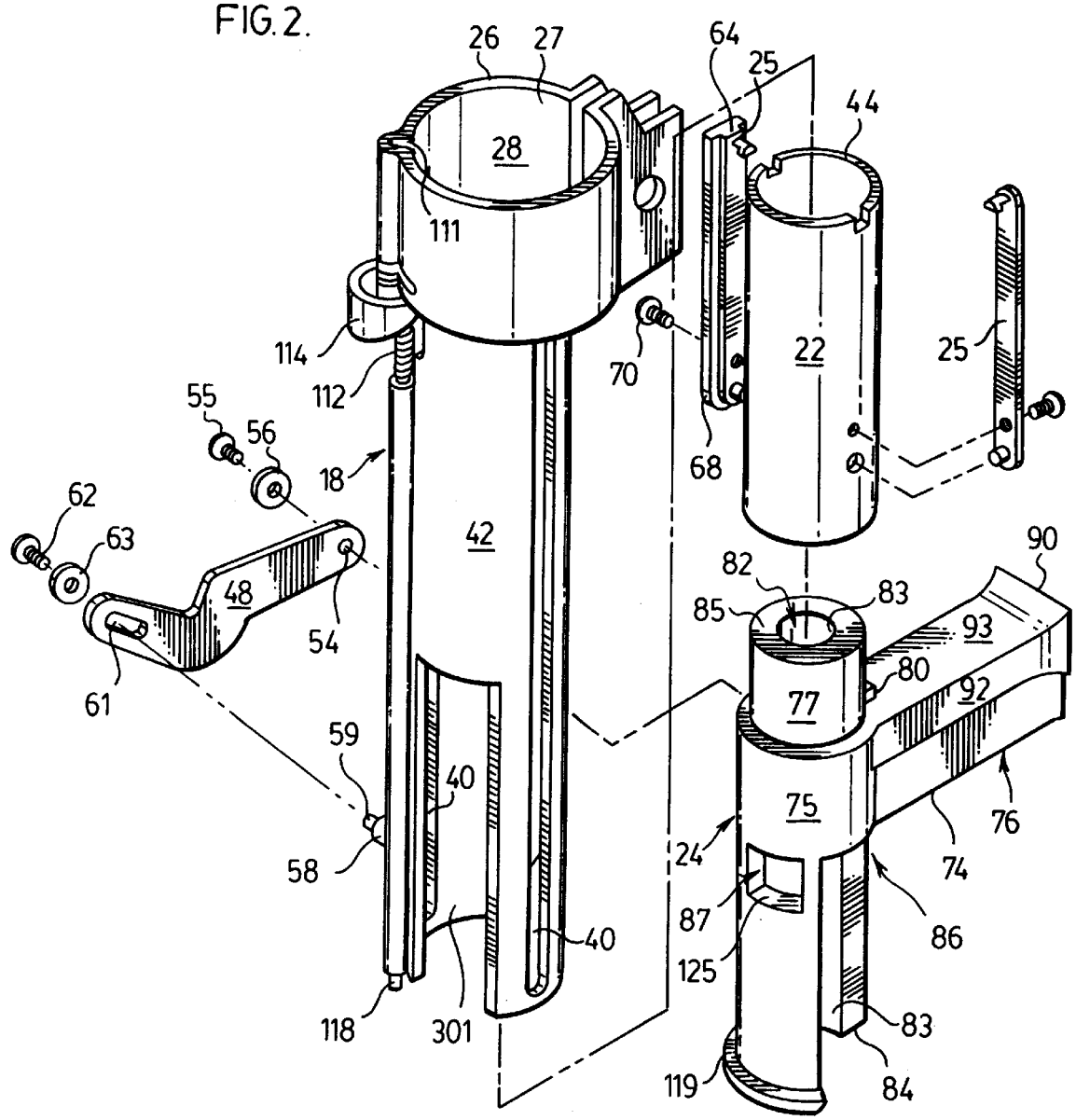
FIG. 2 is an exploded pictorial view of the elements of the driver attachment shown in FIG. 1.
Figure 4:
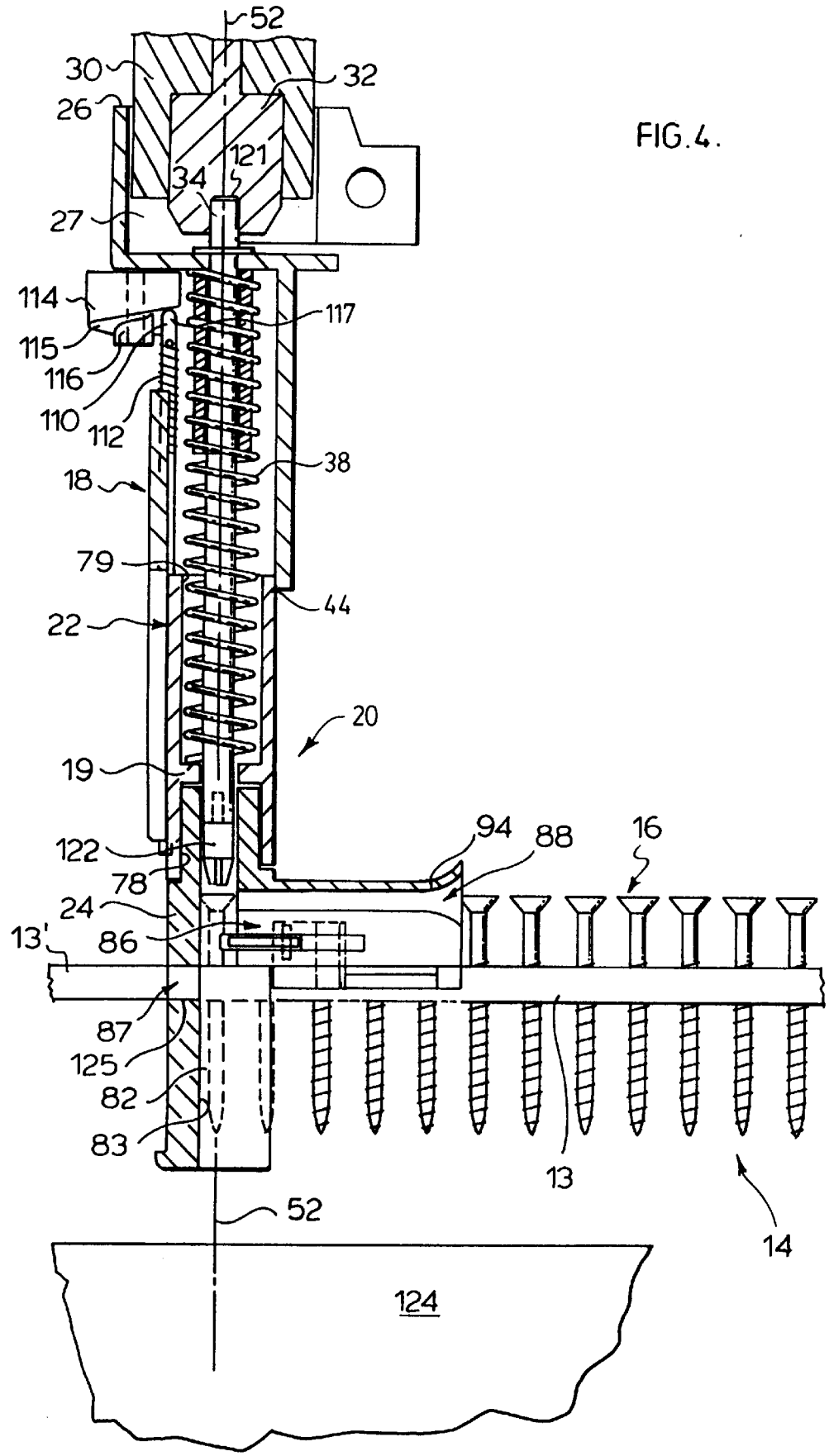
FIG. 4 is a schematic partially cross-sectional view of the driver attachment of FIG. 1 in a fully extended position as seen in FIG. 1 through a plane passing through the longitudinal axis of the drive shaft and centrally of the screws in the screwstrip.

Reference is made to FIG. 2 showing an exploded view of major components of the driver attachment 12 as housing 18 and a slide body comprising a rear portion 22 and a removable nose portion 24. FIGS. 4 and 5 show in cross-section the interaction of these components.

The rearmost end 26 of the housing 18 has a rearwardly directed socket 27 with a longitudinal slot 28 in its sidewall to receive and securely clamp the housing 18 onto the housing 30 of the power driver 11 so as to secure the housing 18 of the driver attachment to the housing 30 of the power driver against relative movement. The power driver 11 has a chuck 32 rotatable in the driver housing 30 by an electric motor (not shown). The chuck 32 releasably engages the driver shaft 34 in known manner.

As seen in FIG. 4, the slide body 20 is slidably received in the housing 18 with the driver shaft 34 received in a bore passing through the rear portion 22 and nose portion 24 of the slide body 20. A compression spring 38 disposed between the housing 18 and the rear portion 22 coaxially about the driver shaft 34 biases the slide body away from the housing 18 from a retracted position towards an extended position. As shown, the spring 38 is disposed between the housing 18 and the rear portion 22. Key members or slide stops 25, best shown in FIG. 2, are secured to the rear portion 22 of the slide body. The two slide stops 25 slide in two longitudinal keyway slots 40 on each side of the part cylindrical sidewall 42 of the housing 18 to key the rear portion 22 of the slide body to the housing 18 against relative rotation and to prevent the slide body being moved out of the housing 18 past a fully extended position.

The rear portion 22 comprises a generally cylindrical element 44 secured to the nose portion 24.

The nose portion 24 includes a guide tube 75 and a feed channel element 76 extending radially from the guide tube 75. The feed channel element 76 has a channelway 88 to receive a screwstrip and via which screws of the screwstrip are advanced into the guide tube 75 for driving successively by the driver shaft 34.

A shuttle 96 is slidably mounted on the feed channel element 76 for sliding in a raceway 94 transverse to the axis of the drive shaft 34 towards and away from the guide tube 75. The shuttle 96 carries a pawl 99, best seen in FIG. 6, to engage the screwstrip and to advance the screwstrip when the shuttle 96 moves towards the guide tube 75.

A lever 48 has a first end 49 coupled to the shuttle 96 and a second end 50 coupled to the housing 18. In this regard, shuttle 96 carries a shuttle mount post 51 having a reduced diameter pivot pin 52 at its end and presenting shuttle shoulder surface 53.

Lever 48 has a circular opening 54 at its first end sized to journal on pin 52. A screw 55 carrying a washer 56 secures the first end of the lever 48 to the post 51 for pivoting on pin 52 with a rear surface 57 of the lever 48 supported on shoulder surface 53.

Housing 18 carries a housing mount post 58 having a reduced diameter pivot pin 59 at its end and presenting housing shoulder surface 60.

Lever 48 has, at its second end, a lost motion slot 61 with semicircular ends. Slot 61 is sized to receive pin 59 therein, permitting relative sliding along the length of the slot and relative pivoting about the axis of the pin 59 when the pin is in any location in the slot. A screw 62 carrying a washer 63 secures the second end of the lever 48 to the post 58 for sliding and pivoting of slot 61 on pin 59 with the rear surface 57 of the lever 48 supported on the shoulder surface 60.

Due to the lever 48 being coupled between the housing 18 and shuttle 96, relative sliding of the slide body 20 and housing 18 results in sliding of the shuttle relative the slide body 20.

The slide stop 25 secured to the slide body 20 on the same side of the attachment as the lever 48 includes a key portion 64 and a bearing plate 65. The key portion 64 extends through the keyway slot 40 so as to locate the bearing plate 65 radially outward of the side wall 42 of the housing 18. The slide stop 25 carrying the bearing plate 65 is secured to the body portion by a bolt 70 extending through opening 67. The bearing plate 65 has a forwardly directed bearing surface 68 adapted to engage with a camming surface 69 on lever 48. In an assembled assembly, the bearing plate 65 is axially inline with the lever 48 axially rearward of the lever 48 such that when the slide body 20 is proximate the extended position, the bearing surface 68 of the bearing plate 65 engages the camming surface 69. The support shoulders 53 and 60 support the lever 48 axially inline with the bearing plate 65 and with both the bearing plate 65 and lever 48 disposed in a plane which is parallel a plane in which the shuttle 96 slides relative the slide body 20. Each pivot pin 52 and 59 is disposed about an axis normal such plane.

Operation of the attachment is now described with reference to FIGS. 7 to 15, each of which show a side view of the assembled attachment of FIGS. 1 to 6 in successive steps in a cycle of operation. FIG. 7 shows the attachment in a fully extended position which position is also shown in cross-section in FIG. 4. As seen in FIG. 4, the shuttle 96 is fully advanced such that its pawl 99 is positioned to locate the screw to be driven axially in the guide tube 75. Also as seen in FIG. 4, the bit 122 on the driver shaft 34 is spaced rearwardly from the screw to be driven. FIG. 7 shows the pin 59 as received in the rearward end of the loss motion slot 61. The bearing plate 65 is fully seated on the camming surface 69 of lever 48.

In retraction of the attachment from the position of FIG. 7 to the position of FIG. 8, the pin 59 slides forwardly in the loss motion slot 61. The bearing plate 65 remains fully seated on lever 48. The lever 48 does not pivot on either pin 52 or pin 59 but moves directly forwardly parallel the axis so that the shuttle 96 does not slide in its raceway but rather maintains a constant, stationary advanced position relative the raceway such that the screw to be driven is maintained in the same position axially aligned with the driver shaft 34. The retraction of the slide body 20 relative the housing 18 with the shuttle 96 in the advanced position is sufficient that with the shuttle 95 in the advanced position, the bit 122 on the driver shaft 34 engages the screw to be driven, seating the bit in the recess 213 of the screw head and commencing to drive the screw towards a workpiece. With the bit seated and engaged in the recess of the screw head, the bit holds the screw and thereby the screwstrip against movement.

In retraction of the attachment from the position of FIG. 8 to the position of FIG. 9, the lever 48 pivots about pin 59 in the forward end of slot 61 and about pin 52. The lever assumes an angulation in which it extends more transversely to the axis and the lever slides shuttle 96 transversely away from the driver shaft to a fully withdrawn position. Preferably, the shuttle 96 does not move from the fully advanced position until the bit is ensured to be engaged in the screw with the shuttle 96 moving towards the withdrawn position merely in time to clear the head of the screw as it is driven forwardly. In FIG. 8, a line drawn between pin 52 and pin 59 is normal the axis of the driver shaft 34. The bearing plate 65 is carried rearwardly with the slide body out of engagement with the lever 48.

In retraction of the attachment from the position of FIG. 9 to the fully retracted position of FIG. 10, the pin 52 slides from the front to the rear end of the loss motion slot 61 such that the shuttle 96 remains in substantially the same fully withdrawn position as in FIG. 9.

From the fully retracted position of FIG. 10, the attachment now extends successively through the positions shown in FIGS. 11, 12, 13 and 14 and then to the fully extended position shown in FIG. 15 which is the same as that shown in FIG. 7.

In initial extension from FIG. 11 to FIG. 12, the pin 52 slides from the rear end of the loss motion slot 61 whereby the shuttle 96 remains in substantially the same fully advanced position as in FIG. 11. FIG. 12 corresponds in relative positioning of the lever to FIG. 9.

In extension, the attachment assumes in succession the position shown from FIG. 12 through FIGS. 13 and 14 to FIG. 15 with lever 48 pivoting about pin 59 with the pin received in the rear end of the slot 61 and the movement of the lever 48 drawing the shuttle 96 towards the axis from the fully withdrawn position of FIG. 11 to the fully advanced position of FIG. 15. In shuttle 96 moving towards the axis, the pawl 99 engages the screwstrip and advances the screwstrip towards the axis to locate the next screw to be driven axially in line with the driver shaft 34. When FIGS. 11 to 15 are viewed in progression, the bearing plate 65 is shown to slide forwardly with the slide body 20 relative the housing from positions rearward of the lever 48 into positions in engagement with the lever 48 as the slide body 20 approaches and becomes proximate the fully extended position. FIG. 13 shows the position in which the bearing plate 65 first engages the lever 48. The bearing plate 65 and lever 48 remain in continued engagement in extension from FIG. 13 to FIG. 15 in which the bearing surface 68 of bearing plate 65 is fully seated in the complementary shaped camming surface 69 of lever 48.

The engagement of lever 48 by the bearing plate 65 assists in supplying increased forces to the lever to draw the shuttle inwardly towards the axis and overcome any resistance offered by the screwstrip to advancing. By the bearing plate 65 engaging the lever 48 between the first and second ends of the lever and thereby closer to the first end than the pin 59, the bearing plate 65 acts as a fulcrum closer to the load application site at pin 52 to increase the mechanical advantage. The contact point or fulcrum between the bearing plate 65 and the lever 48 shifts forwardly down the lever 48 as the slide body and housing relatively retract and thus provide increased mechanical advantage.

The bearing surface 68 and camming surface 69 are complementarily configured such that they impart to the lever 48 forces to cause the lever 48 to follow the same relative motion as that dictated by the guiding of the lever 48 on the two pins 52 and 59. The riding of the bearing surface 68 on the camming surface 69 assists in urging the shuttle 96 towards the driver shaft and in overcoming resistance to advance of the screwstrip.

The fully extended position of FIG. 15 is identical to that of FIG. 7 and from which a further cycle of operation may commence.

In the retraction and extension of the attachment from the position of FIG. 7 through FIGS. 8 to 15, the lever does not, as seen in side view in these figures, substantially extend beyond the edges of the shuttle body and housing. This is advantageous to keep the relative profile and bulk of the attachment at a minimum.

A loss motion mechanism comprising the slot 61 and pin 59 is provided at the second end of the lever 48 to permit the attachment to initially be retracted from the position of FIG. 7 to the position of FIG. 8 with the shuttle 96 and its pawl 99 not moving so as to retain the screw to be driven axially inline with the driver shaft. In an alternate version, a loss motion slot could be provided at the first end of the lever extended rearwardly when in the position of FIG. 7 and with a circular bore at the second end. With the bearing plate modified to be spaced rearwardly on the slide body from its location shown in FIG. 7 a distance equal to the length of the slot, a similar operation could be achieved to that with the illustrated attachment.

It is, however, not necessary that a loss motion mechanism be provided. For example, if a mechanism is provided to prevent movement of an advanced screwstrip away from the driver shaft which mechanism is independent of the shuttle 96, then there is no need for the loss motion mechanism when the attachment retracts from the position of FIG. 7 to the position of FIG. 8. A mechanism to prevent movement of the advanced screwstrip towards the withdrawn position could comprise a pawl similar to pawl 99 which would extend into the channelway 88 but be fixedly mounted to the channelway 88 and would permit advance of the screwstrip but prevent withdrawal of the screwstrip.

To the extent the retraction stroke does not retract the slide body substantially beyond the position shown in FIG. 9, then a loss motion mechanism is not necessary. However, even if a cycle of operation of the attachment includes moving past the position in FIG. 9, then the attachment may be adapted to interact with a screwstrip such that the movement of the shuttle 96 inward between FIG. 9 and FIG. 10 and outward between FIG. 10 and FIG. 11 does not affect proper advance of the next screw.

In the preferred embodiment in movement from FIG. 11 to FIG. 12, the pin 59 slides to the rear end of slot 61 and the shuttle 96 is stationary in its raceway. This is not necessary, however, is preferred to assist in preventing the shuttle 96 from advancing the screwstrip until the driver shaft is withdrawn as to prevent the advancing screw from engaging the withdrawing driver shaft. Such operation may, in part, be assured by having the initial resistance to the shuttle 96 sliding towards the driver shaft greater than the resistance to sliding of the pin 59 in slot 61. The relative resistance of the shuttle 96 to movement could be adjusted by modification of the raceway and/or providing a spring to bias the shuttle 96 towards or away from the advanced position, for example, about guide pin 72. FIG. 6 shows a preferred helical coil spring 25 in a compressed condition disposed about guide pin 72 and extending between the shuttle 96 and one end wall of the raceway 94 to bias the shuttle 96 away from the end wall and towards the guide tube 75. This coil spring 25 is not shown in FIG. 3 to assist in clearly showing the guide pin 72.

The bearing plate 65 is advantageous to provide smooth operation by assisting in moving the shuttle 96 towards the axis when the slide body 20 is proximate the fully extended position. The provision of a bearing plate 65 is not necessary but is preferred.

The nose portion 24 has a generally cylindrical screw guide element or guide tube 75 arranged generally coaxially about longitudinal axis 52 and a flange-like screw feed channel element 76 extending radially from the guide tube 75.

The guide tube 75 has a cylindrical portion 77 at its rear end with a cylindrical exterior surface sized to be closely received, preferably in a friction fit, within a forwardly opening cylindrical bore 78 in the forward end of the rear portion 22. A radially extending key 80 is provided to extend from the cylindrical portion 77 of the nose portion 24 to be received in a correspondingly sized keyway slot 82 in the rear portion 22 as best seen in FIG. 4 and 7 to secure the nose portion 24 to the rear portion 22 against relative pivoting about the longitudinal axis 52.

The guide tube 75 has a cylindrical bore or guideway 82 extending axially through the guide tube with the guideway 82 delineated and bordered by a radially extending cylindrical sidewall 83 and open at its forward axial end 84 and at its rearward axial end 85.

The guide tube 75 has a rearward section adjacent its rear end 85 in which the sidewall 83 extends 360° about the guideway 82. Forward of the rearward section, the guide tube has a forward section best seen in FIG. 4 and which has an access opening 86, shown in the drawings as being on the right hand side of the guide tube 75. Screw access opening 86 is provided to permit the screwstrip 14 including retaining strip 13 and screws 16 to move radially inwardly into the guideway 82 from the right as seen in FIG. 4 and 5. Each screw preferably has a head 17 with a diameter marginally smaller than the diameter of the sidewall 83. It follows that where the head of the screw is to enter the guideway 82, the screw access opening must have circumferential extent of at least 180°. Where the shank 208 of the screw is to enter the guideway, the screw access opening may have a lesser circumferential extent.

In the forward section, the sidewall 83 of the guide tube 75 engages the radially outermost periphery of the head 17 of the screw 16, to axially locate the screw head 17 coaxially within the guideway 82 in axial alignment with the drive shaft 34. In this regard, the sidewall 83 preferably extends about the screw sufficiently to coaxially locate the screw head and thus preferably extend about the screw head at least 120°, more preferably, at least 150° and most preferably about 180°.

An exit opening 87, shown towards the left hand side of the guide tube 75 in FIGS. 4 and 5, is provided of a size to permit the spent plastic strip 13 from which the screws 16 have been driven to exit from the guideway 82. The exit opening 87 is shown as an opening bordered on its front, rear and two sides to assist in retaining the spent strip in the exit opening. Forwardly of the exit opening 87, the sidewall 83 of the guide tube 75 is shown as extending greater than about 180° about the longitudinal axis 52 so as to continue to provide a sidewall 83 which can assist and positively coaxially guiding the head 17 of a screw 16 being driven.

Figure 3:
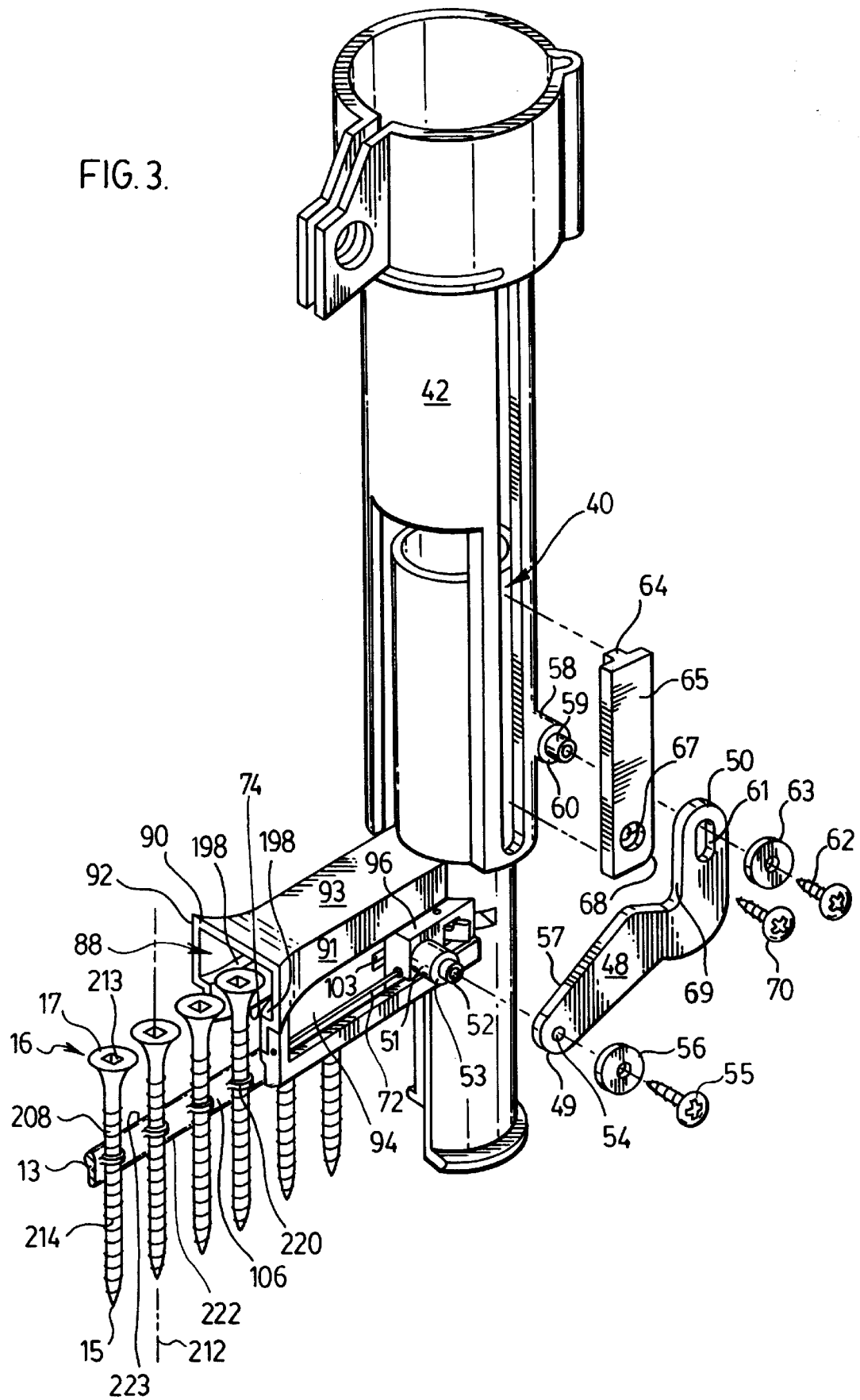
FIG. 3 is a partially exploded pictorial view of the opposite side of the driver attachment to that shown in FIG. 2 and with a screwstrip positioned therein.

The screw feed channel element 76 is best seen in FIGS. 3 and 4 as providing a channelway 88 which extends radially relative the longitudinal axis 52 to intersect with the guideway 82 in the guide tube 75. In this regard, the channelway 88 opens to the guideway 82 as the screw access opening 86. The channelway 88 provides a channel of a cross-section similar to that of the screw access opening 86 from the screw access opening 86 to a remote entranceway opening 90. The channelway 88 is defined between two sidewalls 91 and 92 joined by a top wall 93. The major sidewall 91 is shown as extending from the heads 17 of the screws 16 forwardly to at least partially behind the plastic retaining strip 13. The lesser sidewall 92 is shown as extending from the heads 17 of the screws 16 forwardly to above the plastic strip 13. Stopping the lesser sidewall from extending down over the strip 13 assists in reducing friction between the strip 13 and the lesser sidewall. The sidewalls 91 and 92 define the channelway 88 with a cross-section conforming closely to that of the screwstrip 14 and its strip 13 and screws 16 with an enlarged width where the heads of the screws are located and an enlarged width where the retaining strip 13 is provided about the screws. The sidewalls 91 and 92 also have an enlarged funnelling section at the entranceway opening 90 which tapers inwardly to assist in guiding the screwstrip to enter the channelway.

As best seen in FIG. 3, the major sidewall 91 is provided on its exterior back surface with a raceway 94 extending parallel the channelway 88 and in which the shuttle 96 is captured to be slidable towards and away from the guide tube 75 between an advanced position near the guide tube and a withdrawn position remote from the guide tube.

The shuttle 96 has a guide bore 71 therethrough to be received about a guide pin 72 which has each of its ends secured in portions forming end walls of the raceway 94 such that the guide pin 72 positively retains and guides the shuttle 96 in the raceway 94.

Shuttle 96 carries the pawl 99 to engage the screwstrip 14 and with movement of the shuttle 96 to successively advance the strip one screw at a time. As seen in FIG. 6, the shuttle 96 has a fixed post 100 on which the pawl 99 is journalled about an axis parallel the longitudinal axis 52 about which the driver shaft 34 rotates. The pawl 99 has a strip pusher arm 101 which extends through a slot 103 in the major sidewall 91 to engage and advance the screwstrip. The pawl 99 has a manual release arm 102 away from pusher arm 101 and which extends out through a slot 104 in the shuttle 99. A torsional spring is disposed about post 100 between pawl 99 and shuttle 96 and urges the pusher arm 101 clockwise as seen in FIG. 6. The spring biases the pusher arm 101 into the screwstrip 14. The engagement of release arm 102 on the right hand end of slot 104 limits the pivoting of the pawl 99 clockwise to the position shown in FIG. 6.

The pusher arm 101 of the pawl 99 has a cam face 107. On the shuttle moving away from the guide tube 75 towards the withdrawn position, i.e., to the left in FIG. 6, the cam face 107 will engage the screws 16 and/or the strip 13 and permit the pusher arm 101 to pivot about post 100 against the bias of spring so that the pusher arm 101 may move with the shuttle to the left.

The pusher arm 101 has an engagement face 108 to engage the screws 16 and/or strip 13. On the shuttle moving towards the guide tube 75 towards the advanced position, i.e., to the right in FIG. 6, the engagement face 108 will engage the screws 16 and/or strip 13 and advance the screwstrip to the right as seen in FIG. 6 so as to position a screw 16 into the guideway 82 in a position to be driven and to hold the screwstrip 14 against movement towards the left. Preferably, as shown in FIG. 4, the engagement face 108 of the pusher arm engages the screw between its head 17 and the strip 13 as this has been found advantageous, particularly to avoid misfeeding with a nose portion 24 as shown with engagement of the screw heads in the channelway 88 and engagement of the spent strip 13' with the support surface 125.

The release arm 102 permits manual withdrawal of the screwstrip 14. A user may with his finger or thumb manually pivot the release arm 102 against the bias of spring so that the pusher arm 101 and its engagement face 108 is moved away from and clear of the screwstrip 14 whereby the screwstrip may manually be withdrawn as may be useful to clear jams or change screwstrips. As seen in FIG. 7, when the assembly is in the fully extended position, the release arm 102 is accessible to one side of the lever 48. In more retracted positions, such as shown in FIGS. 9 to 13, the release arm 102 is still manually accessible under the lever 48, however, with the lever 48 advantageously shielding release arm 102 for accidental engagement.

Reference is now particularly made to FIGS. 3 and 6 which show a preferred configuration of the screw feed channel element which facilitates ready insertion advance and withdrawal of screwstrips. A screwstrip may be inserted into the channelway 88 merely by pushing a screwstrip into the entrance 90. On pushing the screwstrip inwardly, the screwstrip will engage the cam face 107 of the pusher arm 101 overcoming the bias of a torsional spring disposed about the post 100 and permitting the screwstrip to slide towards a fully advanced position. To withdraw a screwstrip, release arm 102 is manually engaged to withdraw the pusher arm 101 away from engagement of the screwstrip. The channelway 88 is configured to minimize friction between the screwstrip and the channelway yet provide for easy guiding and insertion. It is for this purpose that the major side wall 91 of the channelway preferably extends from the head 17 of the screws forwardly to behind the plastic retaining strip 13 and not any substantial distance past the plastic retaining strip 13. Similarly, the lesser side wall 92 of the channelway extends from the head 17 of the screws down forwardly to above the plastic strip 13. It is greatly advantageous that the lesser side wall 92 not extend down over the plastic strip 13 to assist in reducing friction. As well, a bottom edge 74 of the lesser side wall is disposed rearwardly of a rearwardly directed surface 223 of the retaining strip 13 and can provide a camming surface to loosely engage the rearwardly directed rear surface 223 of the screwstrip to further assist and enhance sliding and guiding of the screwstrip.

With the lever 48 coupled to the shuttle 96 and to the housing 18, sliding of the slide body 20 and the housing 18 in a cycle from an extended position to a retracted position and then back to an extended position results in reciprocal pivoting of the lever 48 which slides the shuttle 96 between the advanced and withdrawn position in its raceway 94 and hence results in the pawl 99 first retracting from engagement with a first screw to be driven to behind the next screw and then advancing this next screw into a position to be driven.

The screw feed advance mechanism carried on the nose portion has been illustrated merely as comprising a reciprocally slidable shuttle carrying a pawl. Various other shuttle configurations may be adopted with the shuttle moving along a pre-set pathway which, preferably, is straight but may be curved. For example, the shuttle could be supported as the end of a pivoting arm with the pathway being an arc in a plane parallel to a plane including the lever 48.

The nose portion 24 is removable from the rear portion 22. The nose portion 24 and rear portion 22 may be coupled together by axially inserting the cylindrical portion 77 of the guide tube 75 into the bore 78 in the rear portion 22 with the key 80 aligned with the keyway slot 82 and with the front end 56 of the forward arm 54 of the lever 48 aligned with the opening 98 in the shuttle 96. Thus, the removable nose portion 24 may be coupled to the rear portion 22 merely by axially aligning the nose portion and the rear portion and moving the two elements together in a direction parallel the longitudinal axis 52.

With the nose portion 24 held on the rear portion 22 by a friction fit, the nose portion 24 can manually be removed by a user merely by the manual application of force. The nose portion 24 is removable from the rear portion 22 merely by disengaging one of the ends of the lever 48 from its respective post slot 59, for example, by disengaging the first end of the lever 48 from post 51 or post 58 as by removing either screw 55 or 62 but otherwise without disassembly or uncoupling of any of the remainder of the screwdriver assembly 10. Thus, the nose portion 24 is removable without otherwise uncoupling of the rear portion 22 relative any of the housing 18, spring 38, power driver 11 or driver shaft 34. Rather than screws 55 or 62, a quick release mechanism could be provided.

The nose portion 24 carries the guide tube 75 with its screw locating guideway 82, the screw feed channel element 76 with its channelway 88, and screw feed advance mechanism with the reciprocating shuttle 96 and pawl 99 to advance the screwstrip 14 via the channelway 88 into the guideway 82. Each of the guideway 82, channelway 88 and shuttle 96 are preferably customized for screwstrips and screws or other fasteners of a corresponding size. In this context, size includes shape, head diameter, shaft diameter, retaining strip configuration, length, spacing of screws along the retaining strip and the presence or absence of washers amongst other things. Different nose portions 24 are to be configured for different screwstrips and screws. The different nose portions 24 are each compatible with the same rear portion 22 and are readily exchangeable so as to permit the driver attachment to be readily adapted to drive different screwstrips and screws.

Many changes can be made to the physical arrangement of the nose portion 24 to accommodate different screws and fasteners. For example, the cross-sectional shape of the channelway 88 can be changed as can the diameter of the guideway 82. The length of the sidewalls 91 and 92 about the channelway 88 can be varied to accommodate different size screws which may require greater or lesser engagement.

In contrast with the removable nose portion 24 which is intended to be provided in many different replaceable configurations, the remainder of the driver attachment is preferably of a constant unchanged configuration. In this regard, the remainder of the driver attachment may be characterized by the housing 18, rear portion 22 of the slide body 20, drive shaft 34 and spring 38 together with a screw feed activation mechanism comprising the lever 48 and bearing plate 65. This screw feed activation mechanism is activated by relative movement of the housing 18 and rear portion 22 and serves to engage and move the screw feed advance mechanism comprising the shuttle 96 and pawl 99 carried on the nose portion 24.

While the illustrated embodiment shows the slide body 20 as formed with a removable nose portion, this is not necessary and the nose portion 24 and rear portion 22 need not be separable.

The construction of the housing 18 and slide body 20 provide for a compact driver attachment. The housing 18 has a part cylindrical portion formed by sidewall 301. The slide body 20 as best seen in FIG. 3 comprising the rear portion 22 and nose portion 24, has a part cylindrical portion of a uniform radius sized to be marginally smaller than the sidewall 301 of the housing 18. The sidewall 301 extends circumferentially about the part cylindrical portion of the slide body 20 to retain the slide body 20 therein.

The housing is open at its front end and one side to permit the screw feed channel element 76 to slide into and out of the housing 18. Concentrically located about the drive shaft 34 is the spring 38, the part cylindrical portions of the slide body 20, and the part cylindrical portions of the housing 18. The spring 38 biases the slide body to the extended position relative the housing and, in so doing, provides the feeding forces to advance the screwstrip as by the lever 48 moving the shuttle 96. In the preferred embodiment, only one spring 38 is shown and this is preferred. Spring 38 is not necessary and some other mechanism may be provided to move the slide body relative the housing in a cyclic manner for operation.

The driver attachment is provided with an adjustable depth stop mechanism which can be used to adjust the fully retracted position, that is, the extent to which the slide body 20 may slide into the housing 18. The adjustable depth stop mechanism is best seen in FIGS. 2 and 3 as comprising an elongate rod 110 slidably received in an elongate open ended bore 111 provided in the sidewall 42 of the housing 18 and extending parallel to longitudinal axis 52.

A depth setting cam member 114 is secured to the housing 18 for rotation about a pin 116 parallel the longitudinal axis 52. The cam member 114 has a cam surface 115 which varies in depth, parallel the longitudinal axis 52, circumferentially about the cam member 114. A portion of the cam surface 115 is always axially in line with the rod 110. A spring 113 biases the rod 110 rearwardly such that the rear end 117 of the rod engages the cam surface 115. The spring 112 is disposed between the housing and a pin 113 on the rod. By rotation of the cam member 114, the extent to which the rod 110 may slide rearwardly is adjusted.

The rod 110 has a front end 118 which extends forwardly from bore 111 for engagement with rearwardly directed annular stop surface 119 provided on the nose portion 24 of the slide body. The slide body 20 is prevented from further sliding into the housing 18 when the front end 118 of the rod 110 engages the stop surface 119. The extent the slide body 20 may slide into the housing 18 is determined by the length of the rod 110 and the depth of the cam member 114 axially in line with the rod. The cam member 114 is preferably provided with a ratchet-like arrangement to have the cam member 114 remain at any selected position biassed against movement from the selected position and with circular indents or depressions in the cam surface 115 to assist in positive engagement by the rear end 117 of the rod. The cam member 114 is accessible by a user yet is provided to be out the way and not interfere with use of the driver attachment. The depth stop mechanism controls the extent to which screws are driven into a workpiece and thus controls the extent of countersinking. As the depth stop mechanism controls the distance from the workpiece the bit 122 must stop, a given countersink setting will be effective even if strips are switched to use screws of a different length. Adjustment is not required merely because different length screws are to be used.

The nose portion 24 may be customized for use in respect of different size screws by having the location of the stop surface 119 suitably provided axially on the nose portion 24 as may be advantageous for use of different size screws.

The driver shaft 34 is shown in FIGS. 4 and 5 as carrying a split washer 120 engaged in an annular groove near its rear end 121 to assist in retaining the rear end of the driver shaft in the socket 27 of the housing 18. The driver shaft 34 is provided with a removable bit 122 at its forward end which bit can readily be removed for replacement by another bit as for different size screws. Such bits include sockets and the like in any replacement bits will preferably be of an outside diameter complementary to the inside diameter of the guideway 82 in a corresponding replacement nose portion adapted for use with a corresponding sized screws. To accommodate bits of increased diameter over the bit shown in FIGS. 4 and 5 the guideway 82 of the guide tube 75 may be provided with an increased radius, at least commencing at the location where the bit may have an enlarged diameter and extending forwardly therefrom. The guideway 82 in the guide tubes 75 may thus have a step configuration with the sidewall 83 being of a reduced diameter where the driver shaft 34 enters the rear of the guide tube 75 and the sidewall 83 may then increase to an enlarged diameter forwardly to accommodate an enlarged bit such as a socket.

The rear portion 22 is shown in FIGS. 4 and 5 as having a radially inwardly extending annular flange 19 which provides the end of the forwardly opening bore 78 as well as the end of a rearwardly opening bore 79 within which the spring 38 is received. The annular flange 19 has an opening therethrough of a diameter slightly larger than the diameter of the driver shaft 34 so as to assist in journalling the driver shaft therein. The opening through the annular flange 19 may however be increased so as to facilitate the use of driver shafts 34 having enlarged diameters as well as a driver shafts 34 having reduced diameters.

Insofar as the driver shaft 34 has a removable bit 122, it is preferred that as shown, when the driver attachment 12 is in the fully extended position and the nose portion 24 is removed, the bit 122 be readily accessible for removal and replacement. In this regard, it is preferred that the nose portion 124 have a guideway 82 of a minimum diameter throughout its length at least equal to the diameter of the bit 122 such that the nose portion 24 may be removed from the rear portion 22 without the need to remove the bit 122 as may otherwise be the case in the event the guideway 82 may have a stepped configuration.

Operation of the driver attachment is now explained with particular reference to FIGS. 4 and 5. As seen in FIG. 4, the screws 16 to be driven are collated to be held parallel and spaced from each other by the plastic retaining strip 13.

In operation, a screwstrip 14 containing a number of screws 16 collated in the plastic retaining strip 13 is inserted into the channelway 88 with the first screw to be driven received within the guideway 82. To drive the first screw into the workpiece 124, the power driver 11 is activated to rotate the driver shaft 34. The driver shaft 34 and its bit 122, while they are rotated, are reciprocally movable in the guideway 82 towards and away from the workpiece 124. In a driving stroke, manual pressure of the user pushes the housing 18 towards the workpiece 124. With initial manual pressure, the forward end of the nose portion engages the workpiece 124 to compress spring 38 so as to move slide body 20 relative the housing 18 into the housing 18 from an extended position shown in FIG. 4 to a retracted position. On release of this manual pressure, in a return stroke, the compressed spring 38 moves the slide body 20 back to the extended position thereby moving the housing 18 and the driver shaft 34 away from the workpiece.

In a driving stroke, as the driver shaft 34 is axially moved towards the workpiece, the bit 122 engages the screw head 17 to rotate the first screw to be driven. As is known, the plastic strip 13 is formed to release the screw 16 as the screw 16 advances forwardly rotated by the driver shaft 34. Preferably, the screw tip will engage in a workpiece before the head of the screw engages the strip such that engagement of the screw in the workpiece will assist in drawing the screw head through the strip to break the fragible straps, however, this is not necessary and a screw may merely, by pressure from the drive shaft, be released before the screw engages the workpiece. Preferably, on release of the screw 16, the plastic strip 13 deflects away from the screw 16 outwardly so as to not interfere with the screw 16 in its movement into the workplace. After the screw 16 is driven into the workpiece 124, the driver shaft 34 axially moves away from the workpiece under the force of the spring 38 and a successive screw 16 is moved via the screw feed advance mechanism from the channelway 88 through the access opening 86 into the guideway 82 and into the axial alignment in the guideway with the driver shaft 34.

The screw 16 to be driven is held in position in axial alignment with the driver shaft 34 with its screw head 17 abutting the sidewall 83 in the guideway 82. As a screw 16 to be driven is moved into the cylindrical guideway 82, a leading portion of the strip 13' from which screws have previously been driven extends outwardly from the guideway 83 through the exit opening 87 permitting substantially unhindered advance of the screwstrip 14.

To assist in location of a screw to be driven within the guide tube 75, in the preferred embodiment the exit opening 87 is provided with a rearwardly facing locating surfaced 125 adapted to engage and support a forward surface 222 of the strip 13. Thus, on the bit 122 engaging the head of the screw and urging the screw forwardly, the screw may be axially located within the guide tube 75 by reason not only of the head of the screw engaging the sidewall 83 of the guideway but also with the forward surface 222 of the strip 13 engaging the locating surface 125 of the exit opening 87. In this regard, it is advantageous that the forward surface 222 of the retaining strip 13 be accurately formed having regard to the relative location of the screws 16 and particularly the location of the their heads 17. The forward surface 222 of the strip 13 may be complementary formed to the locating surface 125 and if desired indexing notches or the like may be provided in the forward surface 222 of the strip 13 to engage with complementary notches or indents on the locating surface 125 of the entranceway to assist in indexing location of the strip 13 relative the locating surface and enhance the location thereby of the screw 16 within the guide tube 75.

The preferred embodiment illustrated in FIG. 1 shows a screwdriver assembly driving a short length of a screwstrip. Strips of discrete length could be provided for example, one or two feet long which can merely be manually fed into the channelway 88 when desired. Such strips are preferably relatively stiff and self-supporting. Alternately, known cartridges may be mounted to the assembly to carry a coil of the screwstrip.

The driver attachment may be constructed from different materials of construction having regard to characteristics of wear and the intended use of the attachment. Preferably, a number of the parts may be molded from nylon or other suitably strong light weight materials. Parts which are subjected to excessive wear as by engagement with the head of the screw may be formed from metal or alternatively metal inserts may be provided within an injection molded plastic or nylon parts. The provision of a removable nose portions 24 also has the advantage of permitting removable nose portion to be provided with surfaces which would bear the greatest loading and wear and which nose portions may be easily replaced when worn.

In the preferred embodiment, the screwstrip 14 is illustrated as having screws extending normal to the longitudinal extension of the strip 13 and in this context, the channelway 88 is disposed normal to the longitudinal axis 52. It is to be appreciated that screws and other fasteners may be collated on a screwstrip in parallel spaced relation however at an angle to the longitudinal axis of the retaining strip in which case the channelway 88 would be suitably angled relative the longitudinal axis so as to locate and dispose each successive screw parallel to the longitudinal axis 52 of the driver shaft.

A preferred collated screwstrip 14 for use in accordance with the present invention is as illustrated in the drawings and particularly FIG. 3 and are substantially in accordance with Canadian Patent 1,054,982. The screwstrip 14 comprises a retaining strip 13 and a plurality of screws 16. The retaining strip 13 comprises an elongate thin band formed of a plurality of identical sleeves interconnected by lands 106. A screw 16 is received within each sleeve. Each screws 16 has a head 17, a shank 208 carrying external threads 214 and a tip 15. As shown, the external threads extend from below the head 17 to the tip 15.

Each screw is substantially symmetrical about a central longitudinal axis 212. The head 17 has in its top surface a recess 213 for engagement by the screwdriver bit.

Each screw is received with its threaded shank 208 engaged within a sleeve. In forming the sleeves about the screw, as in the manner for example described in Canadian Patent 1,040,600, the exterior surfaces of the sleeves come to be formed with complementary threaded portions which engage the external thread 214 of the screw 16. Each sleeve has a reduced portion between the lands 206 on one first side of the strip 13. This reduced strength portion is shown where the strip extends about each screw merely as a thin strap-like portion or strap 220.

The strip 13 holds the screw 16 in parallel spaced relation a uniform distance apart. The strip 13 has a forward surface 222 and a rear surface 223. The lands 106 extend both between adjacent screws 16, that is, horizontally as seen in FIG. 3, and axially of the screws 16, that is, in the direction of the longitudinal axes 212 of the screws. Thus, the lands comprise webs of plastic material provided over an area extending between sleeves holding the screws and between the forward surface 222 and the rear surface 223. A land 206 effectively is disposed about a plane which is parallel to a plane in which the axes 212 of all the screws lies. Thus, the lands 206 comprise a web which is disposed substantially vertically compared to the vertically oriented screws as shown in the figures. The lands 206 and the sleeves, in effect, are disposed as continuous, vertically disposed strip 13 along the rear of the screws 16, that is, as a strip 13 which is substantially disposed about a plane which is parallel to a plane containing the axes of all screws.

Some screwstrips may bend to assume a coil-like configuration due to flexibility of the lands 206, such that, for example, the screwstrip could be disposed with the heads of the screws disposed into a helical coil, that is, the plane in which all the axes 212 of the screws lie may assume a coiled, helical configuration to closely pack the screws for use. Having the lands 206 and sleeves as a vertically extending web lying in the plane parallel that in which the axes 212 permits such coiling.

The invention is not limited to use of the collated screwstrips illustrated. Many other forms of screwstrips may be used such as those illustrated in U.S. Pat. No. 3,910,324 to Nasiatka; U.S. Pat. No. 5,083,483 to Takaji; U.S. Pat. No. 4,019,631 to Leidegard et al and U.S. Pat. No. 4,018,254 to DeCaro.

While the invention has been described with reference to preferred embodiment, the invention is not so limited. Many variations and modifications will now occur to persons skilled in the art. For a definition of the invention, reference is made to the appended claims.

We claim:

1. An apparatus for driving with a power driver a screwstrip comprising threaded fasteners, such as screws or the like, which are joined together in a strip comprising:

a housing;

an elongate driver shaft for operative connection to a power driver for rotation thereby and defining a longitudinal axis;

a slide body coupled to the housing for displacement parallel to the axis of the driver shaft between an extended position and a retracted position;

the slide body having a guide channel for said screwstrip transverse to the axis, a shuttle carried on the slide body movable relative the slide body transverse to the axis towards and away from the axis, the shuttle carrying an advance pawl for engagement with the screwstrip to advance the screwstrip with movement of the shuttle towards the axis to place successive of the fasteners into axial alignment with the driver shaft for driving by the driver shaft, a lever having a first end coupled to the shuttle and a second end coupled to the housing whereby movement of the slide body axially relative the housing (a) towards the extended position moves the shuttle towards the axis and (b) away from the extended position moves the shuttle away from the axis, a bearing member on the slide body which engages the lever intermediate the first end and the second end of the lever when the slide body is proximate the extended postion such that when the slide body moves axially towards the extended position, the bearing member urges the lever to assist moving the shuttle towards the axis.

2. An apparatus as claimed in claim 1 wherein the shuttle is slidably mounted to the slide body for sliding along a set pathway.

3. An apparatus as claimed in claim 2 wherein the shuttle slides along a linear beam.

4. An apparatus as claimed in claim 1 including a spring biasing the slide body forwardly relative the housing to the extended position.

5. An apparatus as claimed in claim 1 wherein the first end of the lever is pivotally connected to the shuttle.

6. An apparatus as claimed in claim 5 wherein the second end of the lever is pivotally connected to the housing.

7. An apparatus as claimed in claim 5 wherein the second end of the lever includes a lost motion slot, a pin is carried on the housing, the pin is slidable in the lost motion slot and the lever is pivotable about the pin relative the housing.

8. An apparatus as claimed in claim 2 wherein the pathway is disposed in a first plane, the first end of the lever is pivotally connected to the shuttle for pivoting relative the shuttle about an axis normal the first plane and the second end of the lever is pivotally connected to the housing for pivoting relative the housing about an axis normal the first plane.

9. An apparatus as claimed in claim 1 wherein the slide body is disposed radially about the drive shaft, the housing has a side wall disposed generally radially about the slide body, the side wall of the housing having an axially extending keyway radially through the side wall, the slide body having a key member extending radially outwardly therefrom slidably received in the keyway, the bearing member provided on the key member radially outwardly of the side wall of the housing.

10. An apparatus as claimed in claim 9 wherein the keyway and key member cooperate to limit sliding of the slide body and housing between the fully extended and fully retracted positions and prevent relative rotation of the slide body and housing about the axis.

11. An apparatus as claimed in claim 10 wherein the guide channel comprises a radial extension of the slide body, the shuttle carried on the radial extension on a first side of the apparatus, the first end of the lever coupled to the shuttle on the first side of the apparatus, the second end of the lever mounted to the housing on the first side of the apparatus, the lever in extending from its first end on the shuttle to its second end on the housing extends across the keyway axially forward of the bearing member for engagement by the bearing member.

12. An apparatus as claimed in claim 1 wherein the slide body having guide mechanism to locate successive of the screws advanced via the guide channel to be axially in alignment with the driver shaft for engagement in driving of the screws from the guide means by the driver shaft.

13. An apparatus as claimed in claim 1 including a return pawl to engage the screwstrip and prevent movement of the screwstrip in a direction opposite the direction in which the screwstrip is advanced and a release mechanism for releasing said return pawl.

14. An apparatus as claimed in claim 9 wherein a spring is disposed coaxially about the driver shaft engaging the housing at one end and the slide body at another end to urge the slide body to the extended position.

15. An apparatus as claimed in claim 7 wherein a pin is carried on the shuttle, the first end of the lever including a bore, the pin received in the bore such that the lever is pivotable about the pin relative the shuttle.

16. An apparatus as claimed in claim 1 wherein the slide body comprises a nose portion which is removable from a rear portion of the slide body carrying the bearing plate, the lever releaseably engageable with one of the shuttle and the housing for replacement of the removable nose portions with other similar removable nose portions.

17. An apparatus as claimed in claim 1 wherein the lever has an axially rearwardly directed cam surface for engagement by axially forwardly directed bearing surfaces of the bearing member.

18. An apparatus as claimed in claim 1 wherein with the slide body located relative the housing in a fully extended position, the bearing plate engages the lever to assist the shuttle in urging the screwstrip towards the axis to maintain a screw in axial alignment with the driver shaft.

* * * * *

UNITED STATES PATENT AND TRADEMARK OFFICE
CERTIFICATE OF CORRECTION

PATENT NO. : 5,870,933
DATED       : February 16, 1999
INVENTOR(S) : G. Lyle Habermehl et al.

It is certified that error appears in the above-identified patent and that said Letters Patent is hereby corrected as shown below:

On the title page, Item [22]:

| Reads | Should Read |
|---|---|
| Filed: Jan. 1, 1997 | --Filed: Dec. 23, 1996-- |

Signed and Sealed this

First Day of June, 1999

Attest:

Q. TODD DICKINSON

*Attesting Officer*    *Acting Commissioner of Patents and Trademarks*